FACSIMILE BANDWIDTH REDUCING SYSTEM

Filed Nov. 16, 1966 3 Sheets-Sheet 1

INVENTOR.
HUGH F. FROHBACH
ALBERT MACOVSKI
BY Samuel Lindenberg
Arthur Frelich
ATTORNEYS INVENTOR.
HUGH F. FROHBACH
ALBERT MACOVSKI
BY Samuel Lindenberg
Arthur Frelich
ATTORNEYS

FACSIMILE BANDWIDTH REDUCING SYSTEM

Filed Nov. 16, 1966 3 Sheets-Sheet 3

INVENTOR.
HUGH F. FROHBACH
ALBERT MACOVSKI
BY Samuel Lindenberg
Arthur Frelich
ATTORNEYS 3,474,191
FACSIMILE BANDWIDTH REDUCING SYSTEM

Hugh F. Frohbach, Sunnyvale, and Albert Macovski, Palo Alto, Calif., assignors to Southern Pacific Company, San Francisco, Calif., a corporation of Delaware Filed Nov. 16, 1966, Ser. No. 594,912
Int. Cl. H04n 7/12
U.S. Cl. 178—6 11 Claims

ABSTRACT OF THE DISCLOSURE

A sequence of two-level video signals are converted into analog signals each of which carries information indicative of the video signals occurring within a predetermined sampling interval and the occurrence of the last transition of the two-level video signals within the sampling interval. At the receiver the analog signal is converted back to a video signal sequence with provision for comparing the last transition of a newly generated video signal to generate a video signal in accordance with the intermediate transition.

This invention relates to video signal encoding techniques for reducing the bandwidth required for transmitting the signals, and more particularly, to improvements in facsimile systems.

In a Patent No. 3,243,507 to A. Macovski, there has been described a system for encoding the video signal obtained from a facsimile scanning system, by converting the video signals into a sequence of binary bits. Thereafter successive groups of bits are encoded into sequential analog levels. By transmitting these analog levels, instead of the groups of video signals which go into making each analog signal, an increase in the rate of transmission is obtained, or, a saving in the bandwidth.

The nature of a facsimile signal which represents strictly black or white copy is a succession of electrical pulses of uniform amplitude but with varying durations. Furthermore, the leading and trailing edges of these pulses do not necessarily coincide with any periodic "clock signal" and encoding schemes which require the facsimile video signal to be clocked at a rate close to the maximum picture element rate, (i.e. allowed to change from black to white, or white to black, only at instants of time coincident to the train of clock pulses) result in a facsimile copy in which diagonal lines have a characteristic quantized appearance objectionable to the eye. The system briefly described above suffers from this defect since, even though an analog signal is used to represent the video information being transmitted, upon decoding, the analog signal is converted back to clocked visual signals which are then recorded.

In an application which is copending herewith, Ser. No. 590,911, filing date Oct. 31, 1966 by H. Frohbach, and which is assigned to a common assignee, there is described a system for representing a plurality of visual video signals with an analog signal, wherein upon decoding of the analog signal, the original video signals may be reproduced substantially accurately without recourse to clocked visual signals. The present invention is also directed to representation of two-level video signals by an analog signal with provision for decoding the analog signal to obtain the original two-level video signals represented thereby without resorting to clocked visual signals, using a different approach than that of the copending application.

Accordingly, it is an object of the present invention to provide a novel and useful arrangement for converting two-level signals to representative analog signals for conserving bandwidth in transmission and for thereafter converting the analog signals back to video signals which may be reproduced without presenting an appearance which is objectionable to the eye.

Another object of the present invention is the provision of a unique system for encoding two-level signals into representative analog signals which represent the transitions of said two-level video signal within a sampling interval.

Still another object of the present invention is the provision of a novel and useful facsimile transmission system which conserves bandwidth and is simple to construct.

These and other objects of the present invention are provided in a system wherein the sequence of two-level video signals are converted into analog signals each of which carries information indicative of the video signals occurring within a predetermined sampling interval and the occurrence of the last transition of the two-level video signals within said sampling interval. This is converted back at the receiver, into the video signal sequence which occurred during the picture sampling interval with provision being made for comparing the last transition of a newly generated video signal with the transition being generated for determining therefrom whether or not an intermediate transition occurred and, if so, generating the necessary video signal in accordance with the indicated intermediate transition.

More particularly, the present invention employs an encoding process wherein, by way of example, the train of two-level video signals, derived from the facsimile scanning system, is effectively divided into sampling intervals, each having the duration of, but not necessarily coincident with the transitions of two picture elements. An analog signal is generated in response to the nature of the video behaviour during the sampling interval. Each analog level by itself conveys two pieces of information to the receiver, the first being the polarity of the last video transition (if any) within the sampling interval, and the second being the exact position of that transition within the sampling interval. The manner in which the assignment of a particular analog level to any given combination of the last transition polarity and position is quite arbitrary. However, a preferred assignment is one wherein an all-white picture element is transmitted at a zero level signal, black-to-white transitions are transmitted as negative level signals, and white-to-black transitions as positive level signals.

At the receiver, the level of the analog signal provides sufficient information to enable the decoding circuitry to recover the polarity and exact position (within the limits of noise) of the last transition in the sampling interval. Since the sampling interval at the transmitter is chosen to encompass at most two picture elements, it is clear that there can be, at the most, only two video transitions during the sampling interval, the information for which does not appear to be carried within any given analog signal. Thus, the only remaining uncertainty is whether the last transition was the only transition, or whether there was an additional transition preceding it. This uncertainty is easily resolved, in accordance with this invention, by comparison of the recovered video signal with the state of the video signal immediately prior to the present sampling interval, as signalled by the previous analog level and the knowledge that the video must alternate between black and white.

For example, if the last transition of each of two successive sampling intervals are known to be from white-to-black, then it is clear that the second of these two intervals must also have had a transition from black-to-white before the last transition occurred. The same inference would also be made if the video were all black during the first sampling interval. Similarly, if the present sample is known to have a final transition from black-to-white, then an earlier transition from white-to-black can be inferred, if the previous sample was either all white or had a final transition from black-to-white.

The present invention at the decoder performs the comparison and generates the indicated transition in the video signal being produced in response to the received analog signals.

The novel features that are considered characteristic of this invention are set forth with particularity in the appended claims. The invention itself, both as to its organization and method of operation as well as additional objects and advantages thereof, will best be understood from the following description, when read in connection with the accompanying drawings, in which:

FIGURES 1(*a*) and 1(*b*) represent possible assignment schedules or levels for an analog signal in order to represent two-level video transmission occurring within a picture sampling interval;

Figure 1A:
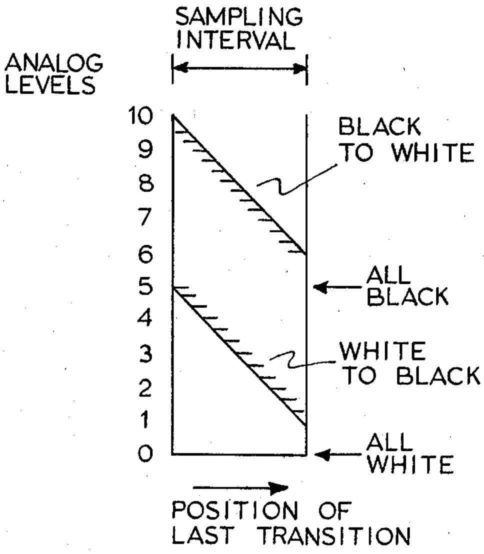
Figure 1B:
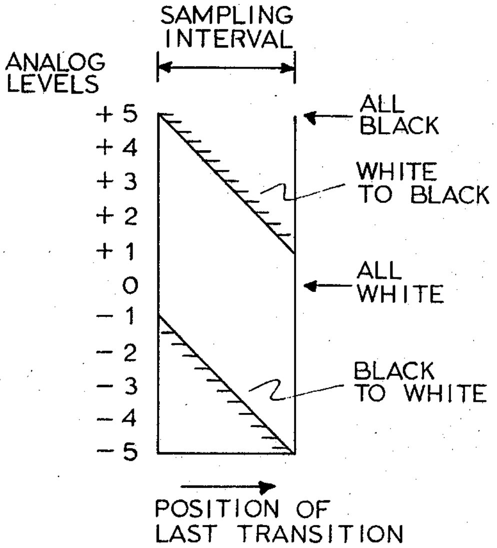

FIGURE 1(*a*) and FIGURE 1(*b*) respectively represent two exemplary assignment schedules, which may be used for representing the video signal transitions occurring within a picture interval. For example, if the picture within the sampling interval is all black the analog signal would have an analog level of +5, (this may be volts, amperes, etc.). If the picture was all white, then the analog level would be zero. If the video signal goes from white to black within the sampling interval, then values between 1 and 5 may represent this, with the level selected being determined by the time of the occurrence of the transition within the sampling interval. Similarly, values between 6 and 10 may be selected to represent the transition of the video signal from white to black within a picture interval.

FIGURE 1(*b*) uses positive and negative signals for performing the identical assignments described in connection with FIGURE 1(*a*). As may be seen from the drawing, the difference between the two, is that in FIGURE 1(*b*) zero is selected to represent the all white level and the black-to-white transitions are represented by values from −1 to −5 and the white-to-black transitions are represented by the values +1 to +5.

Figure 2:
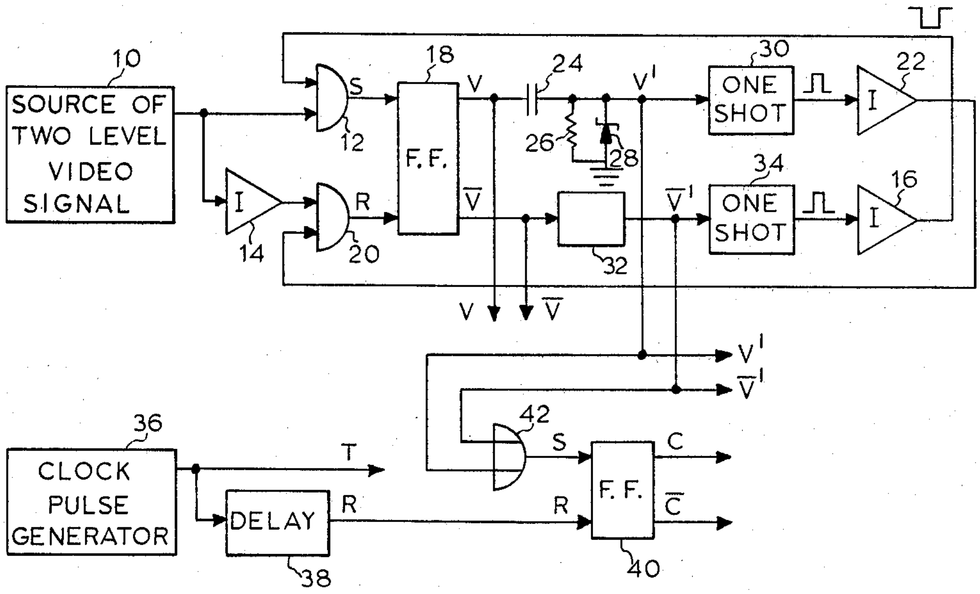
FIGURE 2 is a block schematic diagram of how the circuit for producing signals indicative of a predetermined number of transitions within a picture sampling interval.
Figure 2:
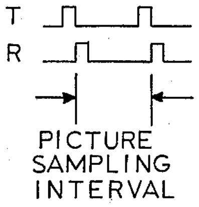

By way of illustration, but not to be construed as a limitation upon the invention, a picture sampling interval will be established as the interval required for scanning two picture elements and a circuit which is shown in FIGURE 2 is provided which will respond over this interval to only two picture element transitions in the video signal. A source of two-level video signals 10, which may be derived by clipping the video signals obtained as a result of scanning facsimile copy is connected to an AND gate 12, and to an inverter 14. It will be assumed that the output of the two-level video signal source 10 comprises a signal representative of a black video signal. The absence of an output may be considered as a white level signal. The output of an inverter, 16, to the AND gate, 12, supplies the second requisite input whereby AND gate 12, may apply an output signal to drive a flip-flop 18. The flip-flop 18 is driven by this output to its set state and the set output signal of the flip-flop is designated by the letter V. The inverter 14, applies its output, in the absence of a black signal input, to the AND gate 20, which has as its second required input the output of the inverter 22. AND gate 20 applies its output to the reset input of the flip-flop 18 which in response thereto provides an output designated as $\bar{V}$.

The V and $\bar{V}$ outputs of flip-flop 18 are applied to leading edge pulse circuits. These provide an output pulse only in response to the positive leading edge of the input pulse. This circuit arrangement comprises a capacitor 24 connected in series with the V output. A resistor 26 is connected from the other end of the capacitor to ground and a diode 28 is also connected from the other end of the capacitor to ground. Polarity of the diode is such that it bypasses the negative going portion of the V output signal and enables a positive pulse to be applied (designated as V′) to a one-shot multivibrator 30. The leading edge pulse circuit 32 to which the $\bar{V}$ output of flip-flop 18 is applied, has its output, $\bar{V}'$, to a one-shot multivibrator 34.

The outputs of the respective one-shot multivibrators 30 and 34 are applied to the inverters 22 and 16. The time constants of the one-shot multivibrators are designed so that the output pulses have a duration or width on the order of one half of the picture sampling interval. This is to ensure that only two transitions are detected within the picture sampling interval.

Assume now that a black signal is provided by the two-level video signals source 10. This will cause AND gate 12, in the presence of an output from inverter 16, to drive flip-flop 18 to its set state. As a result, both a V and a V′ signal are generated. The V′ signal causes the one-shot 30 to apply a pulse of a width of one half picture element to inverter 22. Thus, should the black level signal terminate within the interval of the one-shot pulse, AND gate 20 would not reset flip-flop 18. Should black level signal at the source 10 change to a white signal during the period of the pulse applied to the inverter 22, it must last until the pulse is terminated before the AND gate 20 can be driven in response to the output of the two inverters 14 and 22 to drive flip-flop 18 to its reset state. Of course, after the output of the one-shot 30 terminates, the transition from black-to-white which is applied to the inverter 14 results in the AND gate 20 driving flip-flop 18 to its reset state.

When flip-flop 18 is reset, it produces as its output a $\bar{V}$ and a $\bar{V}'$ signal whereby one-shot multivibrator 34 is driven and provides an output pulse to the inverter 16. As a result, AND gate 12 is not able to restore flip-flop 18 to its set state until the termination of the pulse output of one-shot multivibrator 34.

A clock pulse source 36 generates output pulses designated as T or transfer pulses. A T pulse occurs at the end of every picture sampling interval. A delay line 38, to which the T pulses are applied, delays them slightly and provides as its output pulses designated as R, which occur at the beginning of each picture sampling interval.

The R pulses are applied to reset a flip-flop 40. The set input of flip-flop 40 receives either the V′ or the $\bar{V}$ pulses from the output of an OR gate 42. The set output of flip-flop 40 is designated as a C output and the reset output of flip-flop 40 is designated as a $\bar{C}$ output. Thus, the C output of the flip-flop 40 comprises an indication of the fact that a transition has occurred within a picture sampling interval while a V′ signal indicates that the transition was from white-to-black and a $\bar{V}'$ signal indicates that the transition was black-to-white. A $\bar{C}$ output indicates that no transition occurred during the picture sampling interval.

Figure 3:
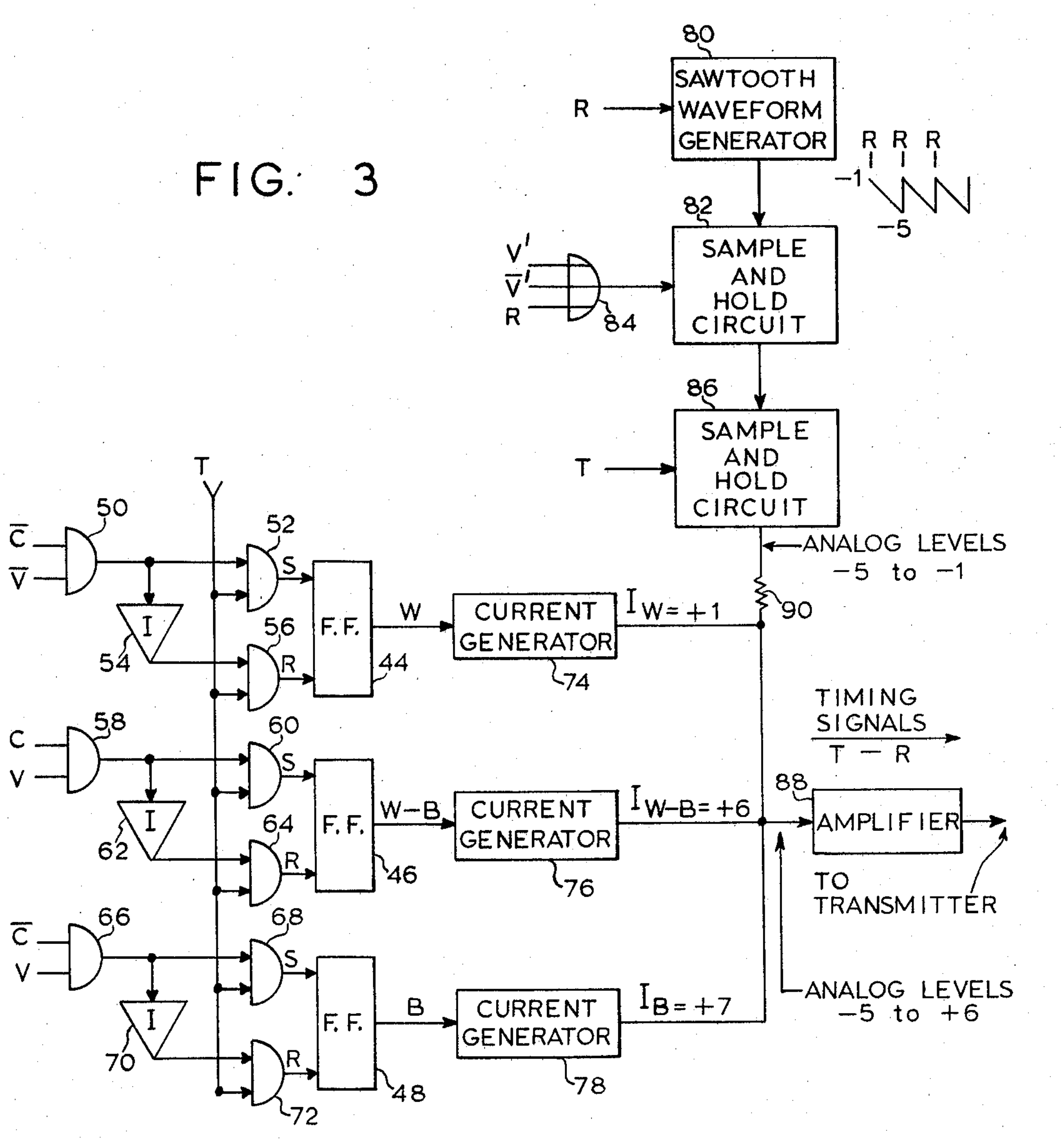
FIGURE 3 is a block schematic diagram of an arrangement for encoding the transition signals derived from FIGURE 2 into an analog level signal.

FIGURE 3 is a block schematic diagram representative of the circuitry for generating an analog signal in response to the signals presented by the circuitry of FIGURE 2. Basically three flip-flops respectively 44, 46 and 48 are employed. When flip-flop 44 is driven to its set state, its output indicates that the signal during the picture sampling interval was all white. Flip-flop 48's set output indicates that the picture during the picture sampling interval was all black. Flip-flop 46 indicates by its set output that there was a white-to-black transition during the picture sampling interval.

An AND gate 50 has as its two required inputs the signals $\overline{C}$ and $\overline{V}$. Its output drives another AND gate 52, which in the presence of the T or transfer signal, can drive flip-flop 44 to its set state. Should $\overline{C}$ and $\overline{V}$ signals not be present, then an inverter 54, which is also connected to the output of the AND gate 50 can apply its output to another AND gate 56. In the presence of a T signal pulse, AND gate 56 can drive flip-flop 44 to its reset state. Thus, at the end of a picture sampling interval, flip-flop 44 will provide an output indicative or not of the presence of a white video signal during the preceding picture sampling interval.

An AND gate 58 receives as its two required inputs the C and V signals. The output of the AND gate 58 is applied to another AND gate 60 and also to an inverter 62. AND gate 60, in the presence of a timing pulse T can drive flip-flop 46 to its set state. An AND gate 64, to which the output of the inverter 62 is applied, in the presence of a T pulse can drive the flip-flop 46 to its reset state. Thus, the C signal, indicative of a transition having occurred within the preceding picture sampling interval, and the V signal indicative of the fact that a black signal is present at the end of the picture sampling interval can drive the flip-flop 46 to its set state, indicative of the occurrence of one or more transitions which ended in black having occurred within the picture sampling interval.

An AND gate 66 receives the $\overline{C}$ and V signal as its two required inputs and in response thereto applies an output to an AND gate 68 and an inverter 70. The output of the inverter is applied to another AND gate 72. Upon the occurrence of the transfer pulse T, either AND gate 68 is enabled to drive flip-flop 48 to its set state, or AND gate 72 is enabled to drive flip-flop 48 to its reset state thus the $\overline{C}$ and V input AND gate 66 indicate that no transiton has occurred within the picture sampling interval and that the picture signal is black, whereupon flip-flop 48 is set.

The respective flip-flops 44, 46 and 48 can drive the respective current generators 74, 76, 78. The current generators may be comprised of amplifiers which respond to the set states of the respective flip-flops to produce output currents having a predetermined amplitude. Thus, the levels may be assigned arbitrarily and by way of example, as +7 for current generator 78 output, +6 for current generator 76 output, and +1 for current generator 74 output.

To the analog signal provided by the current generator 76, there is added another analog signal whose amplitude is indicative of the time of occurrence of a transition. A saw-tooth waveform generator 80, in response to teach reset pulse R, generates a saw-tooth ramp commencing, by way of example, at −1 volt and dropping to −5 volt, by the time the end of the picture sampling interval occurs. This negative going ramp voltage is applied to a sample-and-hold circuit 82, which functions to sample and hold the level of the ramp applied to its input upon the application of a sample pulse.

The sample pulse required for the sample-and-hold circuit is provided by the output of an OR gate 84. A suitable sample-and-hold circuit is shown and described in an article in the IEEE Transactions on Electronic Computers, vol. EC. 13, No. 3, June 1964, entitled "DC Accuracy in a Fast Box Car Circuit" by Harris and Simmons. The input to the OR gate is V′, $\overline{V}'$ and R. As was previously indicated, the V′ signal is coincident with the time occurrence of a white-to-black transition within a picture sampling interval, the $\overline{V}'$ signal is coincident with the occurrence of a black-to-white transition. The R signal indicates the commencement of the picture sampling interval. The output of the sample-and-hold circuit 82 is applied to a succeeding sample-and-hold circuit 86. This circuit, upon the occurrence of the transfer pulse samples the output of the sample-and-hold circuit 82 at that time and transfers this as an output to an amplifier 88, through a summing resistor 90. The other input to the amplifier is the output of one of the current generators 74, 76, 78. Accordingly, the input to the amplifier 88 comprises an analog signal whose level is determined by one of the flip-flops 44, 46, 48, which was enabled at the transfer pulse interval and by a second analog signal whose amplitude in indicative of the time of occurrence of a transition within the picture sampling interval.

In the case of a black-to-white transition during a picture interval a C signal, indicative of the occurrence of a transition, and a $\overline{V}$ signal will be present at the T pulse time. None of the flip-flops 44, 46, 48 will be activated. However, the signal applied to the amplifier 88 will be a voltage having a value between −1 and −5, as determined by the time of transition. Thus, the signal provided for transmission by the system described will range from +5 to −5 volts, represented by its level two picture elements with a picture sampling interval and the time of transition between them, if any.

Figure 4:
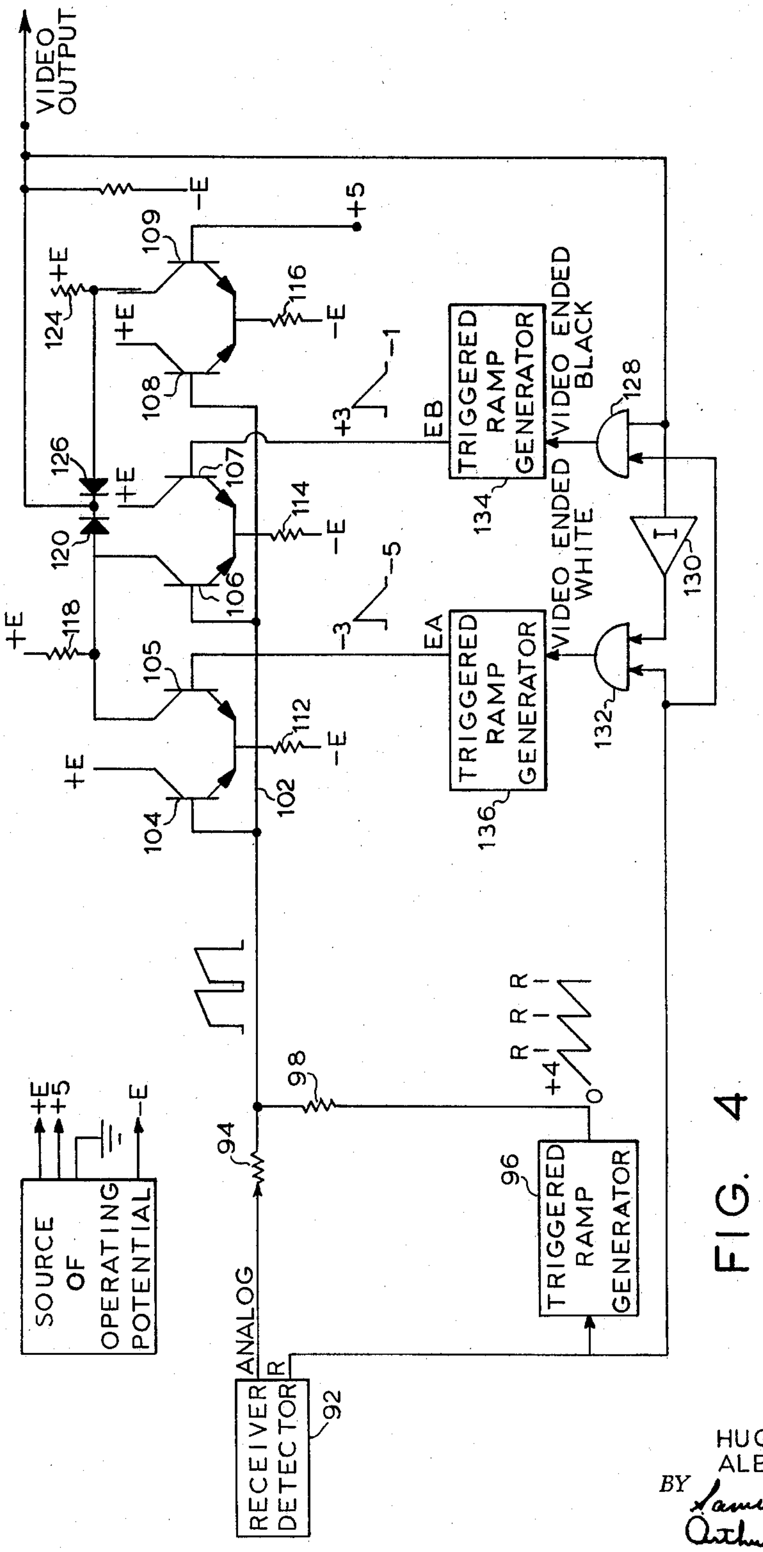
FIGURE 4 is a circuit diagram of an arrangement at the receiver for decoding the analog signals into two-level video signals.

The analog signal which is produced at the output of the amplifier 88 together with the timing signals, which are required in view of the usual facsimile systems, are transmitted in the known manner to location of a receiver. Apparatus at a receiver for decoding the analog signal is represented in block schematic form in FIGURE 4 of the drawings. A receiver detector 92 receives the signals from the transmitter which may have been modulated upon a carrier, for example, and transmitted, demodulates the signals and provides to a first summing resistor 94 the analog signals and to a triggered ramp generator 96 the reset or R signals. The triggered ramp generator, in response to each one of these signals generates a rising ramp voltage which ranges, for example, from 0 to +4 volts, and has a duration of a picture sampling interval. The output of the triggered ramp generator 96 is applied to a second summing resistor 98 which is connected to the other end of the resistor 94. The result of the addition of the analog and triggered ramp signals comprises a signal whose lowest amplitude is that of the received analog signal, which amplitude rises to a level determined by the rising ramp signal. This resultant signal is applied to a multiple threshold circuit, comprising six transistors, 104, 105, 106, 107, 108, 109, two diodes, 120 and 126, and the associated resistors and supply potentials.

Figure 5:
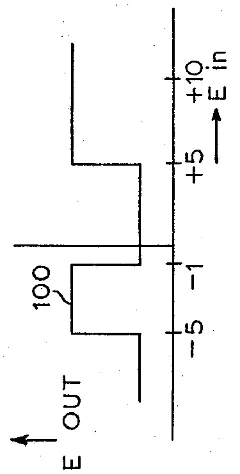
FIGURE 5 is a waveform illustrating desired characteristics for the multiple threshold circuit shown in FIGURE 4.

The multiple threshold circuit comprises a circuit arrangement in response to a rising level input signal, the output signal has an output waveform, as shown in FIGURE 5, which is a function of the input signal. As the input signal rises from a level below −5 volt, at the −5 volt level the output voltage of the circuit rises to a predetermined high level, (black level), as shown by the waveform 100, and this level continues until the input signal attains a value −1. At this time, the output signal drops to a low value, (white level), which is retained until the input signal attains a value of +5 volts. Thereupon the output rises and stays at the high or black level again regardless of increasing values of input. Accordingly, when there is no change during a picture sampling interval, and the video signal was white, the input to the multiple threshold circuit which is the combination of the white representative analog signal and the ramp signal generated by the ramp generator 96, should stay within the region shown in FIGURE 5 as between −1 and +5, since it is assumed that the low level of the output voltage is a white representative signal. Similarly, a black video signal, which does not change within a picture sampling interval should be represented by a signal which does not exceed +5 volts. As indicated in FIGURE 3, the current generator 78 produces a black level on the order of +7 from which there is subtracted the value of the ramp signal at the R interval of −1. Thus, this requirement is satisfied.

An analog signal, which indicates the fact of the transition plus the time of the occurrence of the transition, ranges in amplitude from +1 to +5 volts. Therefore, this signal, together with the ramp signal at the receiver will generate a white-to-black video signal at the output of the multiple threshold circuit, with the time of the transition occurring within the picture interval at substantially the same time as the transition originally occurred.

There is still left the problem of determining whether or not there was a transition between the last transition within the present picture interval and the last transition of the previous picture interval, and what that transition was. This problem is solved by the multiple threshold circuit, shown in FIGURE 4.

The combined input analog signal is applied to a bus line 102. This supplies the signal to the base electrode of transistor 104, 106 and 108. A source of operating potential 110, supplies the requisite +E, −E voltages and a ground or reference potential point to the transistors. The respective transistors 104, 106 and 108 have their emitters connected to the emitters of transistors 105, 107 and 109. The emitters of each of the pairs of transistors are connected through emitter load resistors respectively 112, 114 and 116, to −E potential terminal of the source 110. The collector of transistor 105 and the collector of transistor 106 are connected together and through a collector load resistor 118 to the +E terminal of operating potential source 110. Those collectors are also connected through a diode 120 to the output terminal 122 of the multiple threshold circuit.

The collector of transistor 107 is connected to the +E potential of source 110. The collector of transistor 108 is connected to the +E terminal of source 110. The collector of the transistor 109 is connected through a resistor 124 to the +E output of the source 110, and also through a diode 126 to the output terminal 122 of the multiple threshold circuit.

The output terminal of the multiple threshold circuit is connected to an AND gate 128 and also to an inverter 130. The output of the inverter is connected to another AND gate 132. AND gate 128 is connected to a triggered ramp generator 134 and AND gate 132 has its output connected to a triggered ramp generator 136. The output of the triggered ramp generator 134 is connected to the base of transistor 107 and the output of the triggered ramp generator 136 is connected to the base of transistor 105. The second required input to the respective AND gates 128 and 132 is an R signal which occurs at the beginning of each picture sampling interval. AND gate 128 will provide an output at the reset interval only in the event that there is a black level representative signal applied to its input and AND gate 132 provides an output only in the event that the output of the multiple threshold circuit at the time of the reset pulse is a white representative video signal. Thus, effectively, AND gate 128 senses whether or not the video signal at the termination of the picture sampling interval was black and the AND gate 132 senses whether or not the picture sampling interval signal ended in white. The triggered ramp generator 136 generates a ramp signal that provides a −5 volt output signal when quiescent, but in response to an input generator 136 generates a ramp signal that immediately rises from the quiescent value of −5 volt to a value of −3 volts and then gradually descends over the sampling interval back to −5 volt. The triggered ramp generator 134 has a quiescent output of −1 volt and is response to the input pulse immediately generates a ramp signal that rises from the −1 volt level to +3 volt and then gradually reduces back to −1 volt over the picture sampling interval.

With no input to the multiple threshold circuit, its output is effectively at the white level. Transistors 105, 107 and 109 are conductive thereby maintaining the associated transistors 104, 106 and 108 nonconductive in view of the common emitter coupling. Also, since transistor 105 is conductive, the potential at its collector, which is also connected to the diode 120 is at its low level. Similarly, the potential at the collector of transistor 109, which is connected to the diode 126 is at its low level. The bias which is applied to the base of transistor 105 from the triggered ramp generator in its quiescence state is −5 volt. The bias applied to the transistor 107 from the triggered ramp generator in its quiescence state is −1 volt. The bias applied to transistor 109 from the source of operating potential 110 is +5 volts. Accordingly, in order for an incoming signal applied to the common bus 102, to render transistor 104 the incoming signal must exceed (be more positive than) the −5 volt bias applied to the base of transistor 105. In order for transistor 106 to become conductive the bias applied to the bus 102 must exceed −1 volt, which is the bias applied to the base of transistor 107. Similarly, the signal applied to the bus 102 must exceed +5 volts to render transistor 108 conductive. This is in line with the voltage levels indicated in FIGURE 5. It should be remembered however that these values are exemplary and not restrictive.

Assume now that a white representative analog signal is detected by the receiver detector. As indicated, this signal may be in the range between −1 and +1 volts. The ramp signal generated by the triggered ramp generator 96 rises from 0 to +4 volts. Thus, the white analog signal and the ramp signal combined, can cause transistors 104 and 106 to become conductive. Since the sum of the ramp signal and the analog white signal cannot exceed +5 volts, transistor 108 is not rendered conductive. Since, the shifting of conduction between transistors 105 and 106 does not serve to raise the potential applied to diode 120, the output of the multiple threshold circuit at terminal 122 is low or at a white indicating level.

An all black analog signal which is detected by the receiver, will have a voltage level in excess of +5 volts. This is increased by the effect of the triggered ramp generator 96. Accordingly, while transistors 104, 106 and 108 are all rendered conductive, the output of the threshold circuit is a high level or a black indicating signal which is produced by transistor 109 being rendered nonconductive whereby the input to diode 126 can rise.

For the intermediate values of the received analog signal, which are a combination of the sum of the output of current generator 76 (+6) and the output of the sample-and-hold circuit 86 (between −5 and −1 volts) the amplitude of the analog signal received is between +1 and +5 volts. Initially, transistors 105 and 106 are rendered conductive whereby the output signal of the multiple threshold circuit has a white level. The combined analog signal applied to the bus 102 rises until it exceeds +5 volts, whereupon a black level signal is applied to the output terminal 122 by reason of transistor 109 being rendered nonconductive. The time at which this occurs within the picture sampling interval is determined by the initial level of the received analog signal.

Considering now the effects of the triggered ramp generators 136 and 134, first assume that the preceding picture sampling interval terminated in a white signal and the succeeding picture sampling interval is a white signal. The triggered ramp generator 136 is triggered at the beginning of the succeeding picture sampling interval. However, in view of the fact that transistor 106 is maintained strongly conductive by the "white" analog signal being applied to the bus 102, the rendering of the transistor 105 nonconductive by the output of the triggered ramp generator has no effect on the output of the multiple threshold circuit.

Assume now that a white ending picture interval is followed by a black picture interval which goes black during the reset pulse interval then triggered ramp generator 136 still has no effect upon the "black" output video signal of the multiple threshold circuit in view of the fact that the signal applied to the bus 102 is highly positive and maintains transistor 109 strongly nonconductive.

Consider now that the preceding picture sampling interval has ended in a black signal and the succeeding picture interval is also all black. The triggered ramp output of generator 134 is insufficient to transfer conduction from transistor 106 to transistor 107 in view of the fact that the analog representative signal of the all black video signal is so highly positive. In any event, transistor 109 is maintained nonconductive, whereby the output of the multiple threshold circuit is maintained as a black representative signal.

In the event that the preceding sampling interval terminated in a black signal and the video in the succeeding picture sampling interval goes to all white to generate an all white analog representative signal, then it can be inferred that there was a transition from black to white between the two picture sampling intervals. The triggered ramp generator 134 is triggered at the beginning of the white picture interval and succeeds in rendering transistor 107 conductive in response thereto. Since the incoming white analog signal having a value between −1 and +5 volts, initially renders transistor 104 conductive and would have rendered transistor 106 conductive if not for the presence of the triggered ramp signal applied to the base of transistor 107, both transistors 105 and 106 are initially established as nonconductive with the result that at the beginning of the second picture sampling interval, or the one which follows the interval terminating in the black picture signal, there is a black level output signal at the terminal 122. This signal rapidly drops to the white level, in view of the increasing ramp signal provided by the triggered ramp generator 96 and the decreasing ramp signal provided by the triggered ramp generator 134 whereby transistor 106 is shortly rendered conductive thereby dropping the level of the output signal applied to the terminal 122. Thus the black-to-white transition is produced at the proper time within the second picture sampling interval.

Assume now that the analog signal which is received is one which is a combination of the output of the current generator 76 (+6) plus the output of the sample-and-hold circuit 86 (between −5 and −1) with the resultant analog signal being between +5 to +1 volt. Initially, both transistors 104 and 106 are rendered conductive, whereby the output at the terminal of the multiple threshold circuit is a white representative signal. As the ramp voltage increases, in response to the output of the triggered ramp generator 96, the transistor 108 is rendered nonconductive whereby the output obtained from the multiple threshold circuit becomes a black level signal.

Should the preceding interval have ended in a white level signal, then triggered ramp generator 136 would have rendered transistor 105 conductive which however, would have had no effect on the white output signal since transistor 106 is rendered conductive.

Should the preceding interval have terminated in a black level signal, then triggered ramp generator 134 would have been rendered operative at the beginning of the next sampling interval, whereupon at the outset, transistor 107 would have been maintained conductive thereby preventing transistor 106 from becoming conductive. As a result initially, a black level signal is presented at the output of the multiple threshold circuit which drops to a white level as the ramp signal, which is added by the triggered ramp generator 96, increases to cause transistor 106 to become conductive again. Shortly thereafter however, the increasing ramp and analog signal applied to the bus 102 causes the transistor 108 to become conductive, whereupon transistor 109 is rendered non-conductive with the result that a black output signal is now applied to the terminal 122.

From the foregoing description it can be appreciated that the circuitry described functions to encode a sequence of video signals (not more than two in the illustration given) in a manner so that a signal pattern is presented representative of the signal sequence. In response to the signal pattern a single analog signal is generated, the level of which represents either that the video signal within the picture sampling interval was all white, all black, or was the transitional signal from white-to-black.

Should the video signals within the picture sampling interval have been a transitional signal, then another analog signal is generated in response to the initial signal patterns which adds to the already generated analog signal an additional analog signal whose amplitude is indicative of the time at which the transition has occurred.

At the receiver, the analog signal has another ramp signal applied thereto and then is applied to a multiple threshold circuit. As the applied analog signal increases gradually, the multiple threshold circuit can generate a sequence of video signals which duplicate the video signals within the sampling interval which gave rise to the generation of the analog signal. The multiple threshold circuit also has provision for sensing the last video representative signal occurring at the output terminal thereof, and altering the threshold within the multiple threshold circuit in a manner so that the last transition between white and black level signals is compared to the transition between white and black occurring within the multiple threshold circuit, to determine whether another transition should be generated within the multiple threshold circuit.

What is called is:

1. A system for encoding video signals obtained sequentially from a source comprising:

means for establishing picture sampling intervals including means for generating a clock pulse at the beginning of each of said picture sampling intervals;

first means to which said video signals are applied for producing a first output signal representative of the last video signal occurring within a picture interval and a second output signal representative of a transition between video signals occurring within said sampling interval;

second means responsive to the output of said first means for generating an analog signal having an amplitude representative of the video signals occurring within a picture sampling interval and the time of transition between video signals occurring within said sampling interval, if any; and means for utilizing said analog signal.

2. Apparatus for encoding two-level video signals generated serially at a source into analog signals comprising:

first means to which signals from said source are applied for producing a first output signal representative of the last of a predetermined number of video signals within a picture sampling interval and a second output signal at the time of the transition within said picture sampling interval to said last video signal;

second means responsive to said second signal for producing a transition signal indicative of the occurrence of a transition between video signals occurring within a picture sampling interval and a non-transition signal when no transition occurs;

third means responsive to the first signal output of said first means and to the outputs of said second means for generating an analog signal representative of one of three video signal possibilities occurring within the picture sampling interval;

fourth means responsive to said second signal for producing an analog signal representative of the time of the transition between two-level video signals within a picture sampling interval;

means for combining the outputs from said third and fourth means; and means for utilizing the combined outputs of said third and fourth means.

3. Apparatus as recited in claim 2 wherein:

said first means comprises a flip-flop circuit having a first and second input terminal the application of signals to which respectively produce a black representative output signal and a white representative output signal;

a first and second leading edge pulse circuit, each having an input and an output;

means respectively connecting the black and white signal outputs of said flip-flop circuit to the respective inputs of said first and second and leading edge pulse circuits;

a first and second one-shot multivibrator circuit, each having an input and an output;

means connecting the outputs of the first and second leading edge pulse circuits to the inputs of said first and second one-shot multivibrators respectively;

a first and second AND gate, each having a first and second input and an output;

inverter means connecting the output of said first one-shot multivibrator to said second AND gate input;

second inverter means connecting the output of said second one-shot multivibrator to an input of said first AND gate;

means connecting the output of said first AND gate to the first input of said flip-flop;

means connecting the output of said second AND gate to the second input of said flip-flop;

means connecting white level signals from said two-level signal source to the other input to said second AND gate; and means connecting black level signals from said two-level video signal source to the second input of said first AND gate.

4. Apparatus as recited in claim 3 wherein said second means comprises a flip-flop having a first and second input and a transition signal output responsive to a signal applied to said first input and a non-transition signal output responsive to a signal applied to said second input;

OR gate means connecting said first and second leading edge pulse circuit outputs to said flip-flop first input;

means for generating a clock pulse at the beginning of each sampling interval; and means for applying each clock pulse to the second input of said flip-flop.

5. Apparatus as recited in claim 4 wherein:

said means for generating an analog signal representing one of at least three two-level video signals occurring within a picture sampling interval comprises;

first, second and third flip-flop means each having a set and reset input and an output responsive to the application of a signal to its set input;

means for applying a signal to the set input of said first flip-flop at the end of a picture sampling interval in the absence of a white signal and a non-transition signal;

means for applying a signal to the reset input to said first flip-flop at the end of a picture sampling interval in the absence of a white signal and a non-transition signal;

means for applying a signal to the set input of said second flip-flop at the end of a picture sampling interval in response to a black signal and a transition signal;

means for applying a signal to the reset input to said second flip-flop in response to the absence of a black signal and a transition signal;

means for applying a signal to the set input to said third flip-flop at the end of a picture sampling interval in response to a black signal and a non-transition signal;

means for applying a signal to the reset input to said third flip-flop at the end of a picture sampling interval in response to the absence of a black signal and a non-transition signal;

a first, second and third current generator each generating a different current level in response to the application of an input signal; and means for respectively connecting the outputs of said first, second and third flip-flops to said first, second and third current generator inputs.

6. Apparatus as recited in claim 5 wherein:

said fourth means for generating an analog signal representative of the time of the occurrence of a transition within a picture sampling interval between two-level video signals comprises:

a first saw-tooth wave generator wherein each saw has the duration on the order of a picture sampling interval;

a first sample-and-hold circuit means to which said saw-tooth wave generator output and said leading edge pulse circuit outputs are applied for producing an analog signal having an amplitude indicative of the time of the occurrence of an output from a leading edge pulse circuit; and means for combining the output of said sample-and-hold circuit means with the output of said first, second and third current generators at the termination of a picture sampling interval.

7. Apparatus as recited in claim 2 wherein:

said means for utilizing said analog signal includes:

means for generating a saw-tooth waveform wherein each saw has the duration of a picture sampling interval;

means for combining each saw-tooth output of said saw-tooth wave generator with each combined analog signal to produce a resultant signal; and multiple threshold circuit means to which said resultant signal is applied for producing a sequence of two-level video signals corresponding to the sequence of two-level video signals represented by said combined analog signal.

8. Apparatus as recited in claim 7 wherein said multiple threshold circuit means includes:

means responsive to the output of said multiple threshold circuit means at the end of a picture sampling interval for modifying the subsequently produced two-level video signals in response to the subsequently applied combined analog signal in the event of a difference between the two-level video signal occurring at the output of said multiple threshold circuit at the end of said last picture sampling interval and the two-level video signal represented by the front end of the incoming combined analog signal.

9. Apparatus as recited in claim 7 wherein said multiple threshold circuit comprises:

first, second, third, fourth and fifth and sixth transistors each having base emitter and collector electrodes, the source of operating potential;

means connecting the collector of said first, fourth and fifth transistors to said source of operating potential;

means connecting together the emitters of said first and second transistors and connecting them to said source of operating potential;

means connecting together the emitters of said third and fourth transistors and connecting them to said source of operating potential;

means connecting together the emitters of said fifth and sixth transistors and connecting them to said source of operating potential;

resistor means connecting the collectors of said second and third transistors to said source of operating potential;

resistor means connecting the collector of said six transistors to said source of operating potential;

an output terminal;

a first diode connecting the collector of said third transistor to said output terminal;

resistance means connecting the collector of said six transistors to said source of operating potential;

a second diode connecting the collector of said sixth transistor to said output terminal;

means for applying a first bias to the base of said second transistor rendering it conductive;

means for applying a second bias to the base of said fourth transistor rendering it conductive;

means for applying a third bias to the base of said sixth transistor to render it conductive; and means for applying a combined analog signal to the bases of said first, third and fifth tranisistors.

10. Apparatus as recited in claim 9 wherein said means for inserting a transition signal responsive to the two-level video signal at the output of said multiple threshold circuit at the termination of a picture interval comprises:

a first triggered ramp generator connected to the base of said second transistor;

a second triggered ramp generator connected to the base of said fourth transistor;

means for triggering said first triggered ramp generator when the signal at the output terminal of said multiple threshold circuit at the end of a picture sampling interval is a white representative video signal;

means for triggering said second triggered ramp generator when the signal at the output of said multiple threshold circuit at the end of a picture sampling interval is a black representative signal;

said first triggered ramp generator including means for generating a descending ramp signal which initially biases said second transistor more conductive and descends to a low bias level over the duration of a picture sampling interval;

second triggered ramp generator including means for applying, when triggered, a higher bias level to the base of said fourth transistor to render it more conductive which descends to a lower bias level over the interval of a picture sampling interval.

11. In a system wherein an analog signal is generated having an amplitude representative of the transitions of two-level video signals occurring within a picture sampling interval;

means for converting said analog signal back to the two-level video signals represented thereby comprising a multiple threshold circuit including circuit means for producing a sequence of two-level video representative output signals in response to an input signal attaining different threshold levels;

a ramp signal generator for generating a ramp signal extending over the duration of an analog signal;

means for combining the output of said ramp signal generator with an analog signal to produce a combined analog signal;

means for applying said combined analog signal to said multiple threshold circuit; and means for sensing the output of said multiple threshold circuit for modifying the response of said multiple threshold circuit to a subsequently applied combined analog signal.

References Cited

UNITED STATES PATENTS

| | | | |
|---|---|---|---|
| 3,410,953 | 11/1968 | Quinlan. | |
| 3,414,677 | 12/1968 | Quinlan | 178—6 |

ROBERT L. GRIFFIN, Primary Examiner

ALBERT J. MAYER, Assistant Examiner

U.S. Cl. X.R.

179—15.55